(12) United States Patent
Holmes et al.

(10) Patent No.: US 7,082,965 B2
(45) Date of Patent: Aug. 1, 2006

(54) SOLENOID CONTROL VALVE

(75) Inventors: Garrett R. Holmes, Ortonville, MI (US); Richard T. Tamba, Castle Hill (AU)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/103,268

(22) Filed: Apr. 11, 2005

(65) Prior Publication Data

US 2005/0183783 A1 Aug. 25, 2005

Related U.S. Application Data

(62) Division of application No. 10/449,649, filed on May 30, 2003, now Pat. No. 6,907,901.

(60) Provisional application No. 60/384,997, filed on Jun. 3, 2002.

(51) Int. Cl.
*F15B 13/44* (2006.01)
*F16K 31/06* (2006.01)

(52) U.S. Cl. .................. 137/625.65; 251/50

(58) Field of Classification Search ........... 137/625.65, 137/625.64; 251/50
See application file for complete search history.

(56) References Cited

U.S. PATENT DOCUMENTS

| | | | |
|---|---|---|---|
| 4,655,254 A | 4/1987 | Hafner et al. | |
| 4,821,770 A | 4/1989 | Parrott et al. | |
| 4,947,893 A * | 8/1990 | Miller et al. | 137/625.65 |
| 5,509,448 A | 4/1996 | Wilson et al. | |
| 5,562,125 A * | 10/1996 | Bray | 137/625.64 |
| 5,577,534 A | 11/1996 | Ward | |
| 5,853,028 A * | 12/1998 | Ness et al. | 137/625.65 |
| 5,894,860 A * | 4/1999 | Baldauf et al. | 137/625.65 |
| 5,899,436 A * | 5/1999 | Holmes et al. | 251/129.15 |
| 6,269,827 B1 * | 8/2001 | Potter | 137/625.65 |
| 6,382,248 B1 * | 5/2002 | Long et al. | 137/625.64 |

* cited by examiner

*Primary Examiner*—Ramesh Krishnamurthy
(74) *Attorney, Agent, or Firm*—Warn, Hoffman, Miller & LaLone, P.C.; Greg Dziegielewski

(57) ABSTRACT

A solenoid control valve for use in actuation of a manual hydraulic clutch in a vehicle. The solenoid control valve has an electronically operated solenoid with armature and actuator rod displaced through a channel in the solenoid. A spool valve has a valve body that is coupled at one end to the solenoid. A spool is slidably disposed in the control channel. A first and second dampener chambers are located at the two ends of the spool. The dampeners function to improve the stability in the control system and balance the transient flow forces of the hydraulic fluid as it moves through the valve member. The spool also has a control portion located between the first end and the second end of the spool. The control portion allows the control portion to communicate with a supply, control and exhaust passages in the valve body.

27 Claims, 4 Drawing Sheets

SOLENOID CONTROL VALVE

CROSS-REFERENCE TO RELATED APPLICATIONS

This application is a divisional application of U.S. application Ser. No. 10/449,649, filed May 30, 2003, now U.S. Pat. No. 6,907,901, which claims the benefit of U.S. Provisional Application No. 60/384,997, filed Jun. 3, 2002. The disclosures of the above applications are incorporated herein by reference.

FIELD OF THE INVENTION

The present invention relates to an apparatus and method for calibrating a solenoid controlled spool valve. More particularly, the present invention relates to a solenoid controlled spool valve useful for actuating a hydraulic clutch of a manual transmission for a vehicle.

BACKGROUND OF THE INVENTION

It is desirable in motor vehicles to provide a manually shifted transmission where clutching is accomplished by a hydraulically operated clutch rather than a manually actuated foot pedal type clutch. Ideally such a clutch could be coupled with engine sensors to provide desirable features found in automatic transmissions such as holding the vehicle on hills while allowing manual shifting of the clutch.

Conventional designs of a solenoid combined with a spool valve to control hydraulic actuation of a clutch were found to be lacking. Specifically, it was found that when supplying control fluid to the clutch, a transient flow of force developed which tended to be additive with the solenoid force. This caused overshooting of target control movements that can hinder consistency and stability in clutch control. Additionally, other known designs included contamination sensitivity due to extremely small dampening pilot ports. While such orifices have successfully demonstrated their use in cleaner environments, in the environment of a manual transmission clutch small control orifices were problematic due to the minute amounts of contaminants in the transmission fluid.

Further areas of applicability of the present invention will become apparent from the detailed description provided hereinafter. It should be understood that the detailed description and specific examples are intended for purposes of illustration only and are not intended to limit the scope of the invention.

SUMMARY OF THE INVENTION

The present invention relates to a solenoid control valve for use in actuating a hydraulic clutch in a manual transmission of a vehicle. The solenoid control valve includes an electronically operated solenoid with an armature displaced through a channel in the solenoid. A spool valve includes a valve body that is coupled at one end to the solenoid. The valve body extends away from the one end to a distal second end that is opposite to the one end coupled to the solenoid. The valve body has a supply passage, a control passage and an exhaust passage connectable through the wall of the valve body. A control channel extends linearly through the valve body.

A spool is slidably disposed in the control channel. The spool has a first end that is adjacent to and connected with the armature of the solenoid. A second-end of the spool is located at the second end of the valve body, which is opposite the first end of the spool.

A first dampener chamber is defined by an area between the solenoid and the first end of the spool. A second dampener chamber is defined by an area between the second end of the valve body and the second end of the spool. The first and second dampeners function to improve the stability in the control system and balance the transient flow forces of the hydraulic fluid as it moves through the valve member.

A control portion is located between the first end and the second end of the spool. The control portion is formed by a reduced diameter area on the surface of the spool valve to allow the control portion to communicate with the supply passage, the control passage and the exhaust passage on the valve body.

Utilizing the construction of the present invention results in precise output pressure stability control under varying temperature, source pressures, output flow demands and commanded control pressures in a contaminated hydraulic fluid media typical of automotive transmission applications. It provides fast, repeatable and stable output pressure responses. The system has low output pressure hysteresis and reduced contamination sensitivity. The system also provides high output flow capacities and has low output pressure sensitivity to varying source pressure in the pressure regulating range.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EMBODIMENTS

The following description of the embodiment(s) is merely exemplary in nature and is in no way intended to limit the invention, its application, or uses.

Figure 1:
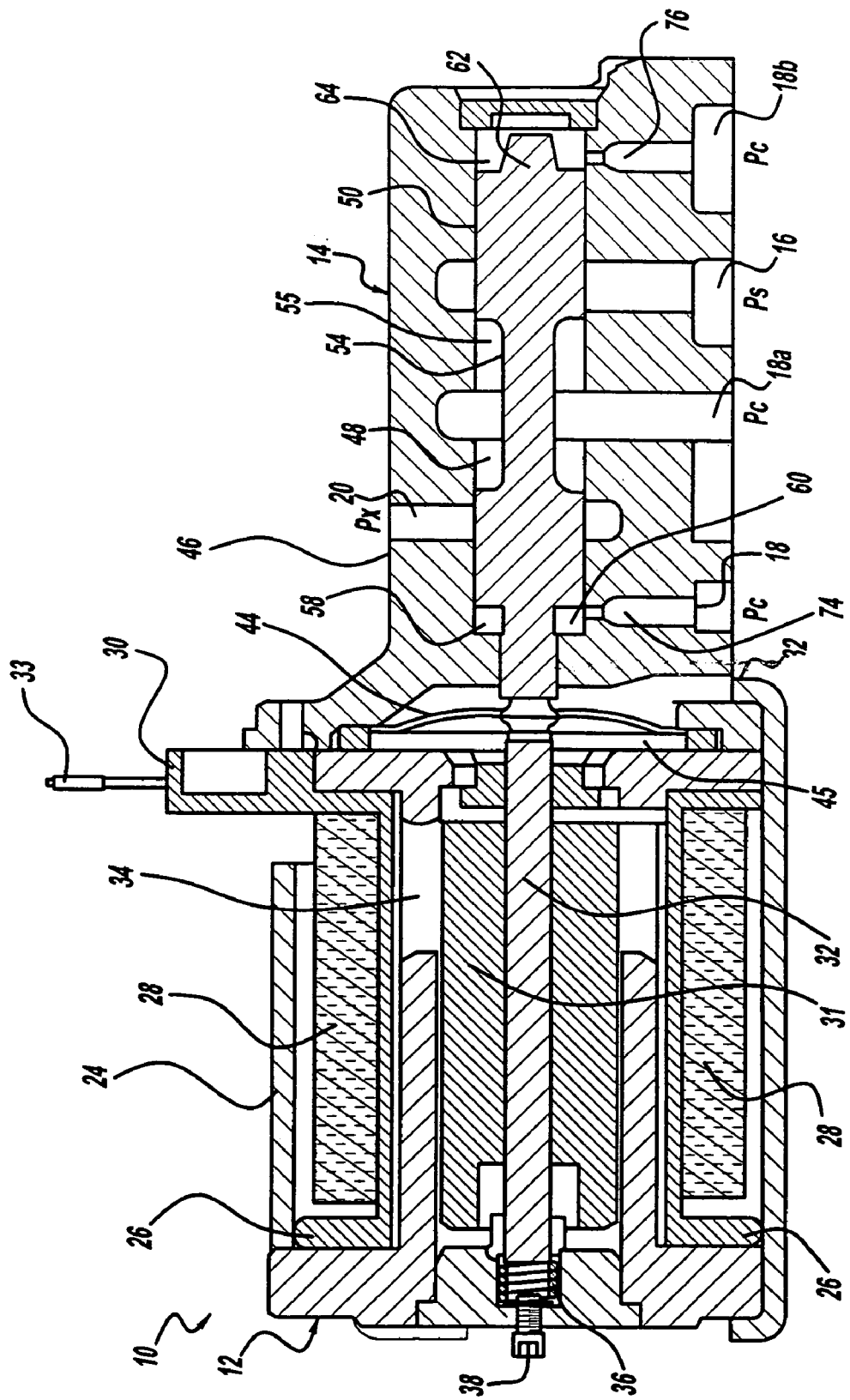
FIG. 1 depicts a longitudinal cross-sectional side view of the solenoid control valve in accordance with the teachings of the present invention.

FIG. 1 depicts a cross-sectional view of a valve 10 in accordance with the teachings of the present invention. The valve 10 as shown and described herein has an electronically controlled solenoid 12 for actuating a spool valve 14 (i.e., hydraulic control valve) to control hydraulic fluid pressure between a supply passage 16, a control passage 18, 18a, 18b, and an exhaust passage 20.

The solenoid 12 has a housing 24 enclosing a bobbin 26. The bobbin 26 has a primary electromagnetic coil 28 wound thereon. A terminal 30 connects with the electromagnetic coil 28 and to ground. Terminal 30 receives a continuous variable, digital control signal from a primary driver (not shown).

Figure 1A:
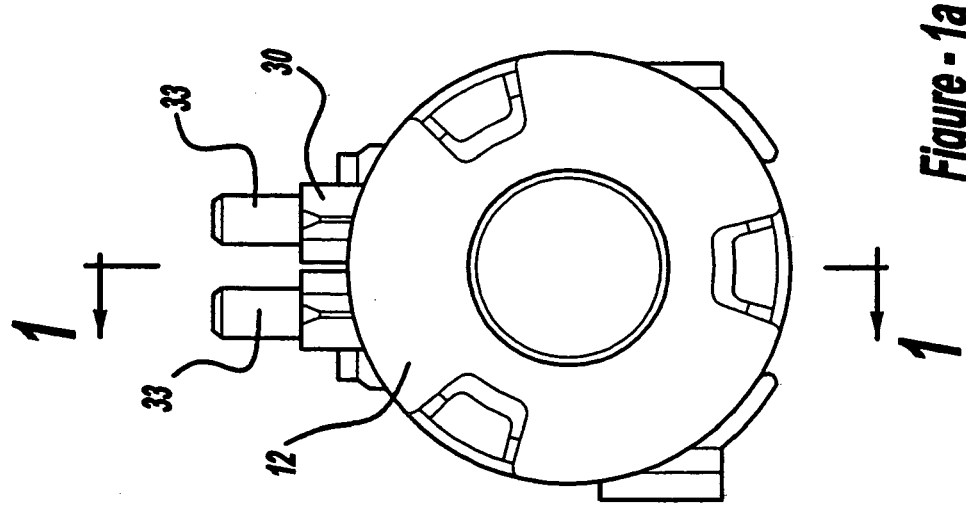
FIG. 1a is an end view of the solenoid in accordance with the teachings of the present invention.

Accordingly, electromagnetic coil 28 is independently controlled by respective continuous variable, digital control signals. Referring to FIG. 1a, a control unit (not shown) is connected to a pair of contacts 33 that is attached to the housing 24 of the solenoid 12. When engine conditions require clutching of the transmission, the control unit inputs a control signal to the solenoid 12 via the contacts 33 and the terminal 30. The control unit in a first embodiment automatically controls actuation during automatic shifts. Such a control unit could also be used for a vehicle stopped on hills or the like. The control system also can function to sense the occurrence of a manual shift and send a signal for actuating the solenoid 12.

The solenoid 12 further includes a channel 34 disposed through the longitudinal axis of the bobbin 26. An armature 31 is co-axially disposed within the channel 34. An actuator rod 32 is disposed through and slides co-axially with armature 31. An armature spring 36 is located at an end of actuator rod 32 opposite the spool valve 14. The armature spring 36 biases the actuator rod 32 and the armature 31 in a generally outward direction towards the spool valve 14. A screw 38 is connectable to the armature spring 36 and allows for mechanical adjustment of the force exerted by the armature spring 36 on the actuator rod 32.

The spool valve 14 is located adjacent to the housing 24 of the solenoid 12. The spool valve 14 has a valve body 46 that is connected to an end of the housing 24 at or near an end of the actuator rod 32 that is opposite the armature spring 36 and the screw 38. The valve body 46 has a bore 48 that extends along the longitudinal axis of the valve body 46. The bore 48 is juxtaposed to the channel 34 of the solenoid housing 24. A spool 50 is provided within the bore 48 that has a rounded cross-section and is slidable within the longitudinal axis of the bore 48 of the valve body 46. A diaphragm 44 is disposed between the actuator rod 32 and the spool 50 to provide a fluid seal between the housing 24 and the valve body 46. The spool 50 and the actuator rod 32 are connectable through the diaphragm 44. Also, a flux tube 45 is disposed between the bobbin 26 and the valve body 46 and completes an electromagnetic circuit for the solenoid 12.

The spool valve 14 is configured so the supply passage 16, the control passages 18, 18a, 18b and the exhaust passage 20 are all interconnected through the outer wall of the valve body 46. The supply passage 16 is connected to a hydraulic pump (not shown) that supplies pressurized hydraulic fluid to the spool valve 14 portion of the valve 10. The control passages 18,18a, 18b are operably connected to a clutch member (not shown). FIG. 1 depicts three regions of the control passage labeled 18, 18a, and 18b which are all connected to one another. The three regions of control passage 18, 18a, 18b serve to help stabilize the movement of the spool 50 as it moves between a clutching position and declutching position. The exhaust passage 20 connects to a hydraulic fluid recovery mechanism (not shown) which will allow pressurized fluid from the control passage 18 to be recirculated to the spool valve 14 through the supply passage 16 via the hydraulic pump.

Along the longitudinal axis of the spool 50 is a central reduced diameter portion 54 that extends across a region between the supply passage 16 and the exhaust passage 20. The central reduced diameter portion 54 is generally positioned near the center of the spool 50, however, it is possible to position the central reduced diameter portion 54 on a region of the spool 50 that is not central, but is still between the ends of the spool 50. The open region between the reduced diameter portion 54 and the sides of the bore 48 forms a pressure transition region 55. As we will see the pressure transition region 55 helps the valve 14 transmit pressure among the supply passage 16, the control passage 18 and the exhaust passage 20. The central reduced diameter portion 54 shown in FIG. 1 depicts what is commonly referred to as an open center reduced diameter portion.

Other embodiments of this invention will depict a closed center reduced diameter portion (see FIGS. 2–4) as opposed to an open center reduced diameter portion. There are many reasons for choosing between an open center and a closed center spool, however, it should be understood that any of the embodiments described in the invention disclosed herein may incorporate either an open center or a closed center spool depending on the needs of a particular application.

The spool 50 also includes a first reduced diameter portion 58 at the end of the spool 50 adjacent to the actuator rod 32 of the solenoid 12 for defining a first dampening chamber 60. A second reduced diameter portion 62 is located on a second end of the spool 50, opposite the first reduced diameter portion 58, and defines a second dampening chamber 64.

The first dampening chamber 60 is formed in the bore 48 of the valve body 46 and circumvents the first reduced diameter portion 58 of the spool valve 14. The second dampening chamber 64 is formed in the bore 48 of the valve body 46 and circumvents the second reduced diameter portion 62 of the spool valve 14. A first feedback orifice 74 is connected between the first dampener chamber 60 and the control passage 18. A second feedback orifice 76 is connected between the second dampener chamber 64 and the control passage 18b.

In the present embodiment of the invention the first and second dampening chambers 60, 64 (i.e., dual dampening chambers) have greater volumes than typical dampening chambers of the past. The greater volume of the first and second dampening chambers 60, 64 will provide improved stability in the control system to balance the transient flow forces throughout the valve 10. Another advantage of the first and second dampening chambers 60, 64 is that there will be a reduced vibration of the spool valve 14 as it moves between a clutching and declutching position. This will allow for a smooth shifting action of the clutch as opposed to a jerking motion that is common to manual clutches. The first and second feedback orifices 74, 76 contribute to the first and second dampening chambers 60, 64 by regulating the pressure of the hydraulic fluid inside of the first and second dampening chambers 60, 64.

The solenoid 12 and the spool valve 14 of the solenoid 12 operate in the following manner. When the electromagnetic coil 28 is energized, the actuator rod 32 will move with the bias force of the armature spring 36 to an outward position (e.g., to the right as shown in FIG. 1) which will also push the spool 50 outward to a clutching position. Movement of the spool 50 to a clutching position inputs pressurized fluid from the supply passage 16 to the control passage 18a. When the electromagnetic coil 28 is deenergized, the spool 50 and the actuator rod 32 will move back to a declutching position as the actuator rod 32 once again exerts force on the armature spring 36 and moves the spool 50 inward (e.g., to the left as shown in FIG. 1). Movement of the spool 50 to a declutching position outputs pressure from the control passage 18a to the exhaust passage 20. The distance that the actuator rod 32 and the spool 50 move is very short. It is only necessary for the spool 50 to move just enough to allow pressurized fluid to pass to the various supply, control, and exhaust passages 16, 18a, 20 respectively.

Figure 2:
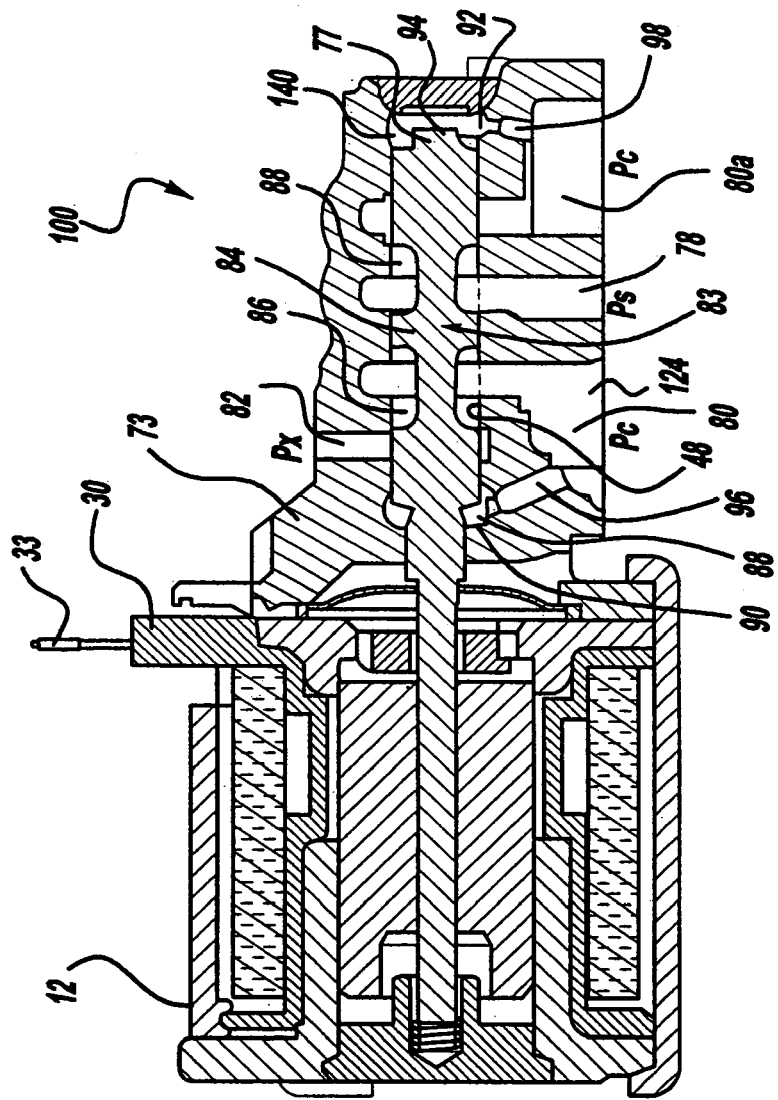
FIG. 2 is a sectional view of an alternate embodiment of a solenoid control valve in accordance with the teachings of the present invention.

FIG. 2 is a sectional view of a control valve 100 in accordance with the teachings of the present invention. The present embodiment of the invention has a solenoid 12, and a spool 76 linearly disposed inside of a bore 48 in a valve body 73 of the spool valve 14. The valve body 73 in this embodiment has a control passage 80, 80a disposed through valve body 73. The control passage 80, 80a are two regions of a larger control passage (not shown). A supply passage 78 is located between the portions of the control passage 80, 80a. An exhaust passage 82 is disposed through valve body 73 between the control passage 80 and the solenoid 12.

FIG. 2 depicts what was previously described as a closed center spool valve. This particular embodiment has a closed center reduced diameter portion 83 located along the longitudinal axis of the spool 77. The closed center reduced diameter portion 83 has a center wall portion 84 that divides the closed center reduced diameter portion 84 into two sub-regions; referred to as a control portion 86 and a supply reduced diameter portion 88. The supply reduced diameter portion 88 will allow pressurized fluid to flow from the supply passage 78 to the control passage 80a when the spool 77 is moved away from the solenoid 12 to a clutching position. The control reduced diameter portion 86 will allow pressurized fluid to flow from the control passage 80, 80a to the exhaust passage 82 when the spool 77 slides toward the solenoid 12 to a declutching position.

The valve 100 also has dual dampeners. There is a first dampening chamber 88 located at a first reduced diameter portion 90 at the end of spool 77. A second dampening chamber 92 is located at a second reduced diameter portion 94 located at an end of the spool 76 opposite the first reduced diameter portion 90. A first feedback orifice 96 connects with the first dampening chamber 88 at an angle so that first feedback orifice 96 will functionally connect with control passage 80 which is connected to the valve body 73 at an area more centrally located on the longitudinal axis of the valve body 73. A second feedback orifice 98 connects with the second dampening chamber 92 at an angle so that the first feedback orifice 90 will functionally connect with the control passage 80a which is connected through the valve body 73 at an area more centrally located on the longitudinal axis of the valve body 73.

Figure 3:
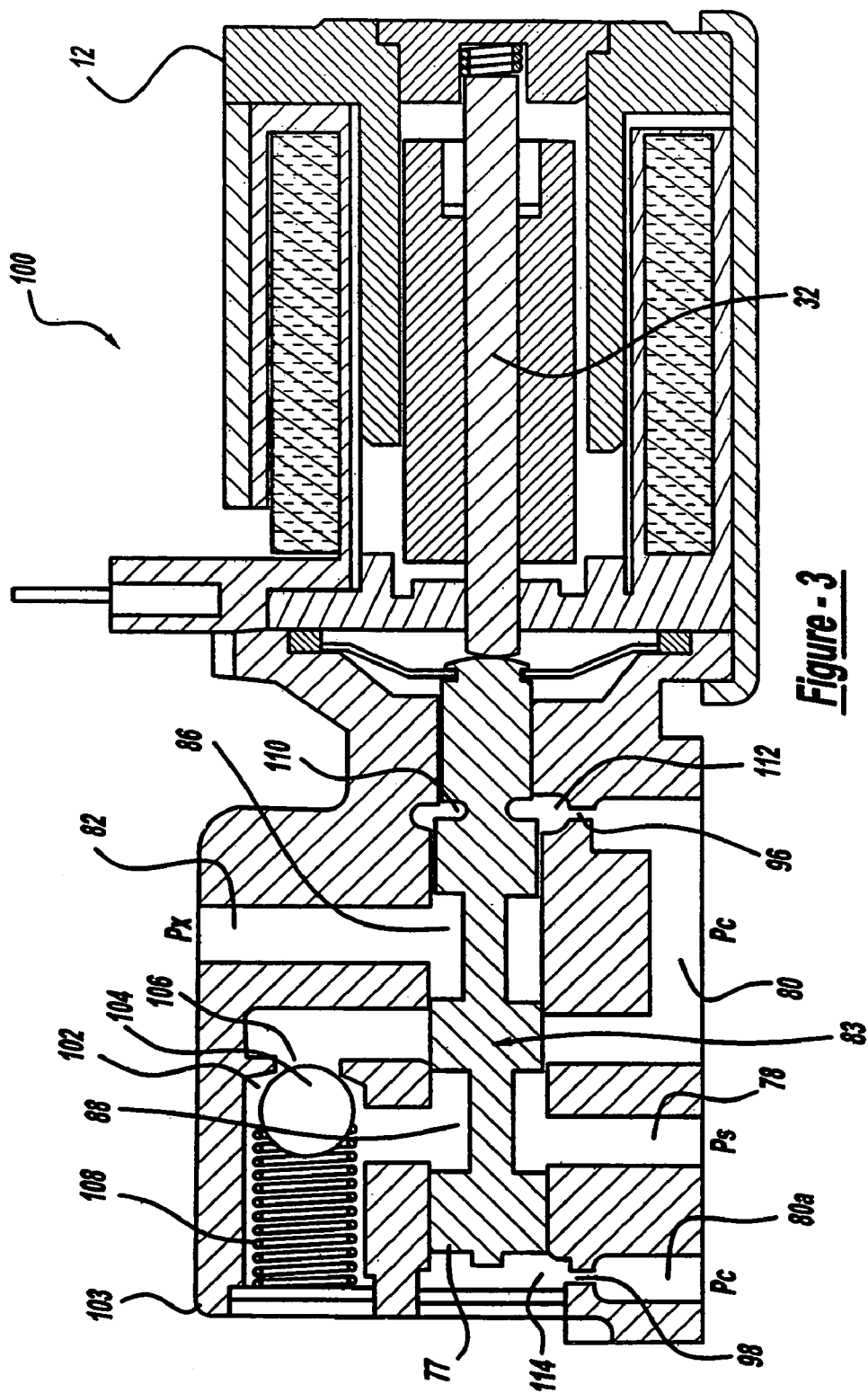
FIG. 3 is a sectional view of an alternate embodiment of a solenoid control valve in accordance with the teachings of the present invention.

FIG. 3 illustrates another alternate embodiment, which incorporates the closed center spool as described in FIG. 2. This particular illustrative embodiment of the invention incorporates the same solenoid 12 and closed center central reduced diameter portion 83 as depicted in FIG. 2. During a declutching operation, pressure in the control passage 80, 80a may buildup and not allow the spool 77 to slide and allow pressure to exit through the exhaust passage 82. The pressure buildup in the control passage 80, 80a causes a condition that is generally referred to as a sticking clutch. The present embodiment of the invention addresses the aforementioned problem by using a check valve 102 disposed in a valve body 103. The check valve 102 is located above the spool 77 on a side of the spool 77 opposite the supply passage 78. The check valve 102 is normally in the closed position, that is, a ball member 104 is seated to block off an opening 106 to the control passage 74. The ball member 104 can be held to the closed position by the supply pressure normally closing off the opening 106. Alternatively, the ball 104 may be held in place using a light spring 108 while the ball member 104 is sealed with pressure from supply passage 78.

As stated previously, the check valve 102 serves the function of unsticking the valve 100 during a declutching operation. Sensors (not shown) can detect a valve stuck condition and respond by reducing pressure in the supply passage 78. When supply pressure is reduced, the ball 104 will become unseated from the opening 106 and the buildup of pressure in the control passage 80 will be allowed to vent through the supply passage 78 and unstick the spool 77. While the check valve 102 is depicted in this embodiment as being incorporated in the valve body 103 it should be understood that the check valve 102 can be incorporated along other regions of the supply passage stream (not shown).

Another feature depicted in the present embodiment of the invention is the placement of the dual dampening passages. In this particular embodiment of the invention the spool 77 has a first reduced diameter ridge 110 located more centrally inward on the spool 77. The first reduced diameter ridge 110 defines a first dampening chamber 112 that has a more central location along the longitudinal axis of spool valve 77.

A second dampening chamber 114 is located at an end of the spool 77 much like the second dampening chamber described in FIG. 2. The result is that the first and second dampening chambers 112, 114 are not spaced as far apart, and will be able to communicate more effectively via the control passage 80, 80a.

Figure 4:
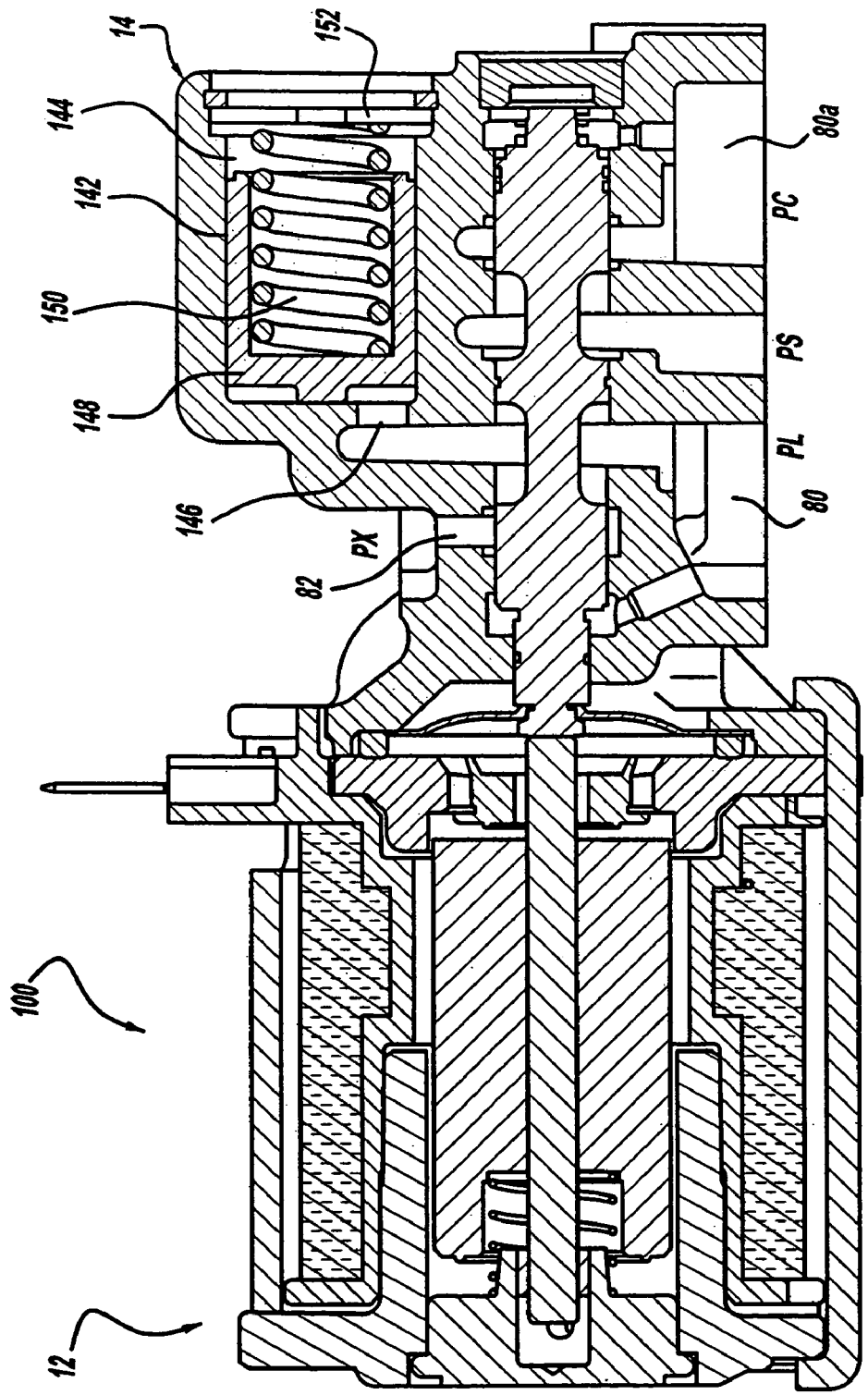
FIG. 4 is a sectional view of an alternate embodiment of a solenoid control valve in accordance with the teachings of the present invention.

FIG. 4 illustrates another alternate embodiment that incorporates a piston accumulator 142. During certain operating ranges of the solenoid 12, pressure can buildup in the control passage 80, 80a and histeresis can occur. In applications where it is necessary to eliminate the effect of histeresis in the normal operating ranges of the valve 100 the piston accumulator 142 can be implemented to further dampen the movement of the spool valve 14. The result of implementing the piston accumulator 142 dampener with a specific spring load and demand is a steady output pressure to the clutch that is not inhibited by vibrational hysteresis that may occur at the higher operating ranges of the spool valve 14.

The piston accumulator 142 that has a chamber 144 connected to control passage 80 via an accumulator inlet 146. Inside of the chamber 144 is a piston 148 that rests against the wall of the chamber 144 near the accumulator inlet 146. The piston 148 is held against the wall of the chamber 144 by a spring 150 that connects between the piston 148 and a washer 152. When pressure builds up in the control passageway 80 the fluid will make contact with the piston 148 via the accumulator inlet 146 and compress the piston 148 and the spring 150. The compression of the piston accumulator 142 will have the effect of dampening the control passage 80 and alleviating unequal fluid pressure in the spool valve 14. Once pressure in the control passageway 80 returns to normal operating pressures the spring 150 will extend and move the piston 148 back to its resting position.

In this embodiment it is possible for the spring 150 to be formed of some other suitable resilient material or even a different form. For instance, it is possible to incorporate a compressible rubber ball that can be compressed by the piston 148 in a high pressure situation, and then expanded to move the piston 148 back to its resting position. It is also possible for the piston 148 and the spring 150 to be replaced with a molded rubber bladder that is capable of moving between an open and closed position in response to pressure buildup in the control passageway 80.

The description of the invention is merely exemplary in nature and, thus, variations that do not depart from the general principles of the invention are intended to be within the scope of the invention. Such variations are not to be regarded as a departure from the spirit and scope of the invention.

What is claimed is:

1. A control valve comprising:
   a solenoid;
   a valve member having a valve body that is connected to and operatively associated with said solenoid, wherein said valve member has a bore disposed linearly inside said valve body so that a first end of said bore is adjacent said solenoid and a second end of said bore is located at an end of said valve body that is distal from said solenoid;
   a spool linearly and slidably disposed in said bore, wherein said spool has a first end positioned in said first end of said bore, adjacent said solenoid, and a second end positioned in said second distal end of said bore;
   a pressure transition region located along said spool between said first end and said second end of said spool, wherein said pressure transition region is formed by a reduced diameter area located on the surface of said spool;
   an accumulator having a chamber operably connected to said bore wherein said accumulator functions to dampen the movement of said spool;
   a first dampening chamber defined by an area between said solenoid and said first end of said spool; and
   a first feedback orifice operably connected between a first dampening chamber and said control passage.

2. The control valve of claim 1 further comprising a pressure supply passage, the control passage and an exhaust port connectable to said valve member through the wall of said valve body.

3. The control valve of claim 2 wherein said valve body is configured so that said pressure transition region can selectively communicate with said pressure supply, said control passage and said exhaust port, wherein, the configuration allows for the selective actuation of a hydraulic clutch.

4. The control valve of claim 2 wherein said spool communicates with said pressure supply to direct pressure to said control passage when said spool is in a first position and said spool directs pressure from said control passage to said exhaust port when said spool is in a second position.

5. The control valve of claim 1 further comprising:
   a second dampening chamber defined by the area between said distal end of said bore and said second end of said spool; and
   a second feedback orifice operably connected between said second dampening chamber and said control passage.

6. The control valve of claim 5 wherein said pressure transition region is a closed center spool.

7. The control valve of claim 5 wherein said first dampening chamber is defined by a reduced diameter portion located more centrally inward on said spool valve and said first feedback orifice is more centrally located and is connected to said valve body and connectable with said first dampening chamber.

8. The control valve of claim 2 wherein said accumulator is located in said supply passage outside of said valve member.

9. The control valve of claim 2 wherein said accumulator is located in a region of said valve body adjacent said control chamber and having an opening operably connected to said pressure transition region.

10. A control valve comprising:
    a solenoid including a linearly configured armature;
    a valve member including a valve body connected at a first end of said valve body to said solenoid in a matter that is co-axial to said armature, and a second end located at a linearly distal end of said valve body, wherein said valve member is operatively associated with said armature, and said valve member has a control channel extending linearly through said valve body, wherein said valve body has a pressure supply passage, a control passage, and an exhaust port all selectively connectable through the wall of said valve body, wherein said valve member has a first dampening chamber and a second dampening chamber formed in said valve body;
    a spool portion slidably disposed in said control channel, wherein said spool portion has a first end adjacent to said solenoid and a second end located at an end opposite said first end and adjacent to said second end of said valve body;
    said first end of said spool portion is a first reduced diameter portion and said second end of said spool portion is a second reduced diameter portion, whereby, said first reduced diameter portion and said second reduced diameter portion are tapered so said first reduced diameter portion and said second reduced diameter portion are more narrow in diameter than the main body of said spool portion;
    a control chamber located between said first end and said second end both of said spool valve, wherein said control chamber is formed by a reduced diameter area on the surface of said spool portion to allow said control chamber to selectively communicate with said pressure passage, said control passage and said exhaust port; and
    an accumulator having a chamber operably connected to said control chamber wherein said accumulator functions to dampen the movement of said spool.

11. The control valve of claim 10 wherein said accumulator is located in said supply passage outside of said valve member.

12. The control valve of claim 10 wherein said accumulator is located in a region of said valve body adjacent said control chamber and having an opening operably connected to said control chamber.

13. The control valve of claim 10 wherein said accumulator further comprises:
    an accumulator inlet operably connecting said chamber of said accumulator to said control chamber;
    a piston movably positioned in said chamber;
    a resilient member contacting said piston and applying force so that said piston is held against said accumulator inlet.

14. The control valve of claim 13 wherein said resilient member is a spring.

15. A solenoid control valve for a vehicle comprising:
    an electronically operated solenoid including a linearly configured armature;
    a spool valve including a valve body with one end connectable to said solenoid and a second end located at a linearly distal end of said valve body, wherein said spool valve is operatively associated with said armature, and said spool valve has a control channel extending linearly through said valve body, wherein said valve body has a pressure source passage, a control passage, and an exhaust port all selectively connectable through the wall of said valve body;

a spool portion slidably disposed in said control channel, wherein said spool portion has a first end adjacent to said solenoid and a second end located at an end opposite said first end adjacent to said second end of said valve body;

a control chamber located between said first end and said second end both of said spool valve, wherein said control chamber is formed by a reduced diameter area on the surface of said spool valve to allow said control chamber to selectively communicate with said pressure source, said control passage and said exhaust port;

a first dampener chamber defined by an area between said solenoid and said first end of said spool valve, a second dampener chamber defined by the area between said distal end of said valve body and said second end of said spool, and a piston accumulator having a chamber connected to said control chamber by an accumulator inlet, wherein said chamber has a piston that rests against a wall of said chamber near said accumulator inlet and said piston is held in place by a spring that connects between said piston and a distal end of said chamber.

16. The solenoid control valve of claim 15 wherein said central reduced diameter portion of said control chamber has a central wall having the same diameter as said spool valve, wherein said control chamber is divided into two parts, a first supply control chamber and a second exhaust control chamber.

17. The solenoid control valve of claim 15 wherein said first dampener chamber and said second dampener chamber have a volumetric area of sufficient size to provide improved stability in the control systems and balance the transient flow forces.

18. The solenoid control valve of claim 15 further comprising:

a first feedback orifice configured to provide communication between said first dampener chamber and said control passage and a second feedback orifice configured to provide communication between said second dampener chamber and said control passage.

19. A control valve comprising:

a solenoid;

a valve member having a valve body that is connected to and operatively associated with said solenoid, where said valve member has a bore disposed linearly inside said valve body so that a first end of said bore is adjacent said solenoid and a second end of said bore is located at an end of said valve body that is distal from said solenoid;

a spool linearly and slidable disposed in said bore, wherein said spool has a first end positioned in said first end of said bore, adjacent said solenoid and a second end positioned in said second distal end of said bore;

a pressure transition region located along said spool between said first end and said second end of said spool, wherein said pressure transition region is formed by a reduced diameter area located on the surface of said spool;

an accumulator having a chamber and an accumulator inlet connected to said chamber, said accumulator having a piston movably positioned in said chamber and a resilient member contacting said piston and applying force so that said piston is moveably positioned against said accumulator inlet, wherein said accumulator functions to dampen the movement of said spool.

20. The control valve of claim 19 wherein said resilient member is a spring.

21. The control valve of claim 19 further comprising a pressure supply passage, a control passage and an exhaust port connectable to said valve member through the wall of said valve body.

22. The control valve of claim 21 wherein said valve body is configured so that said pressure transition region can selectively communicate with said pressure supply, said control passage, and said exhaust port, wherein the configuration allows for the selective actuation of a hydraulic clutch.

23. The control valve of claim 21 wherein said spool communicates with said pressure supply to direct pressure to said control passage when said spool is in a first position and said spool directs pressure from said control passage to said exhaust port when said spool is in a second position.

24. The control valve of claim 21 further comprising:

a first dampening chamber defined by an area between said solenoid and said first end of said spool; and a first feedback orifice operably connected between said first dampening chamber and said control passage.

25. The control valve of claim 24 further comprising:

a second dampening chamber defined by the area between said distal end of said floor and said second end of said spool; and a second feedback orifice operably connected between said second dampening chamber and said control passage.

26. The control valve of claim 25 wherein said pressure transition region is a closed center spool.

27. The control valve of claim 26 wherein said first dampening chamber is defined by a reduced diameter portion located more centrally inward on said spool valve and said first feedback orifice is more centrally located and is connectable to said valve body and connectable with said first dampening chamber.

* * * * *